United States Patent
Schon et al.

(10) Patent No.: US 12,063,444 B1
(45) Date of Patent: Aug. 13, 2024

(54) DIGITAL EVENT ENCODING FOR OPERATING AN EVENT-BASED IMAGE SENSOR

(71) Applicant: PROPHESEE, Paris (FR)

(72) Inventors: Guillaume Schon, Paris (FR); Andrea Mascheroni, Asnieres sur Seine (FR); Thulaxan Naguleswaran, Alfortville (FR); Ting An, Anthony (FR); Patrice Perrin, Sartrouville (FR); Pierre-Antoine Doisneau, Bois Colombes (FR)

(73) Assignee: Prophesee, Paris (FR)

( * ) Notice: Subject to any disclaimer, the term of this patent is extended or adjusted under 35 U.S.C. 154(b) by 0 days.

(21) Appl. No.: 18/272,330

(22) PCT Filed: Jan. 13, 2022

(86) PCT No.: PCT/EP2022/050678
§ 371 (c)(1),
(2) Date: Jul. 13, 2023

(87) PCT Pub. No.: WO2022/152810
PCT Pub. Date: Jul. 21, 2022

(30) Foreign Application Priority Data

Jan. 14, 2021 (EP) .................................. 21305038

(51) Int. Cl.
*H04N 25/707* (2023.01)
*H04N 25/40* (2023.01)
(Continued)

(52) U.S. Cl.
CPC ........... *H04N 25/707* (2023.01); *H04N 25/77* (2023.01)

(58) Field of Classification Search
CPC ...... H04N 25/707; H04N 27/77; H04N 25/40; H04N 25/47; H04N 25/702; H04N 25/703; G06F 8/44; G06F 8/443
See application file for complete search history.

(56) References Cited

U.S. PATENT DOCUMENTS

| 10,531,031 | B2 * | 1/2020 | Park | ..................... H04N 25/772 |
| 11,532,143 | B2 * | 12/2022 | Seo | ........................ H04N 23/80 |

(Continued)

OTHER PUBLICATIONS

PCT International Search Report, mailed May 4, 2022, in International Application No. PCT/EP2022/050678 (2 pages).

*Primary Examiner* — Marly S Camargo
(74) *Attorney, Agent, or Firm* — Finnegan, Henderson, Farabow, Garrett & Dunner, LLP

(57) ABSTRACT

A method is provided for operating an event-based image sensor comprising a plurality of pixel circuits arranged to form a pixel array, each pixel being arranged at a location defined by an address defined by pixel coordinates in the array, wherein each pixel circuit is configured to generate an event, such that each time a light intensity change is detected, an event is characterized by a polarity reflecting a direction of the change. The method comprises performing a line readout of groups of adjacent pixels of a line of pixels, wherein the line readout comprises generating, for each group, at least one packet expressing occurrences of events of a same polarity in said group, each packet being characterized by a polarity and a group address. The method further comprises sending the packets to a processing pipeline where the packets are successively processed, involving a memory access based on the group address, wherein two packets sharing the same group address have different polarities and are consecutively processed.

11 Claims, 5 Drawing Sheets

(51) Int. Cl.
    *H04N 25/47*     (2023.01)
    *H04N 25/702*     (2023.01)
    *H04N 25/703*     (2023.01)
    *H04N 25/77*     (2023.01)

(56) References Cited

U.S. PATENT DOCUMENTS

| | | | |
|---|---|---|---|
| 11,871,125 B2 * | 1/2024 | Perrone | H04N 25/443 |
| 11,885,669 B2 * | 1/2024 | Burns | G01H 9/002 |
| 2018/0262705 A1 | 9/2018 | Park et al. | |
| 2020/0410272 A1 | 12/2020 | Seo et al. | |
| 2021/0044744 A1 * | 2/2021 | Sironi | H04N 25/665 |
| 2021/0258526 A1 * | 8/2021 | Matolin | H04N 25/40 |
| 2023/0412930 A1 * | 12/2023 | Bury | H04N 23/745 |

\* cited by examiner

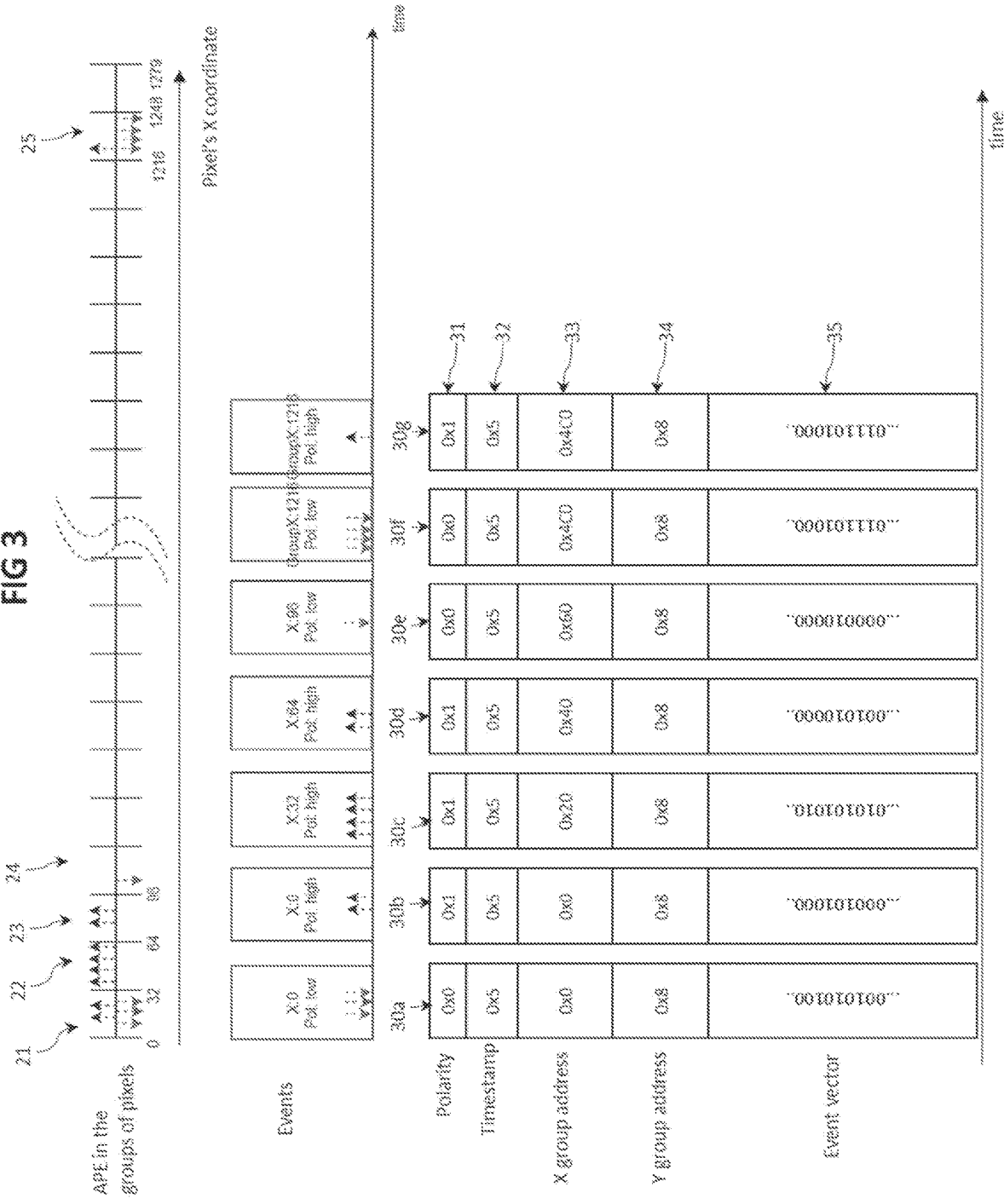

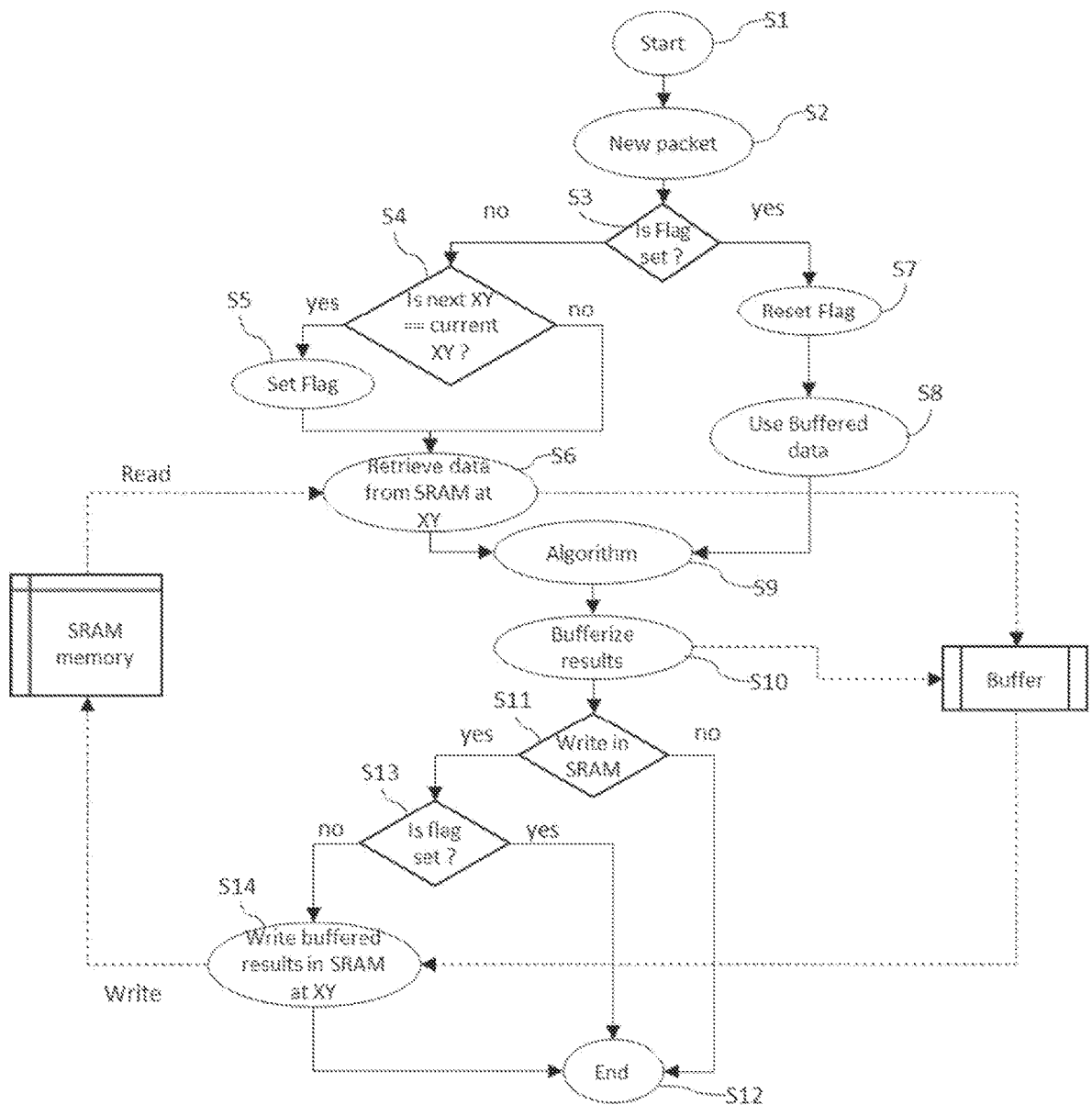

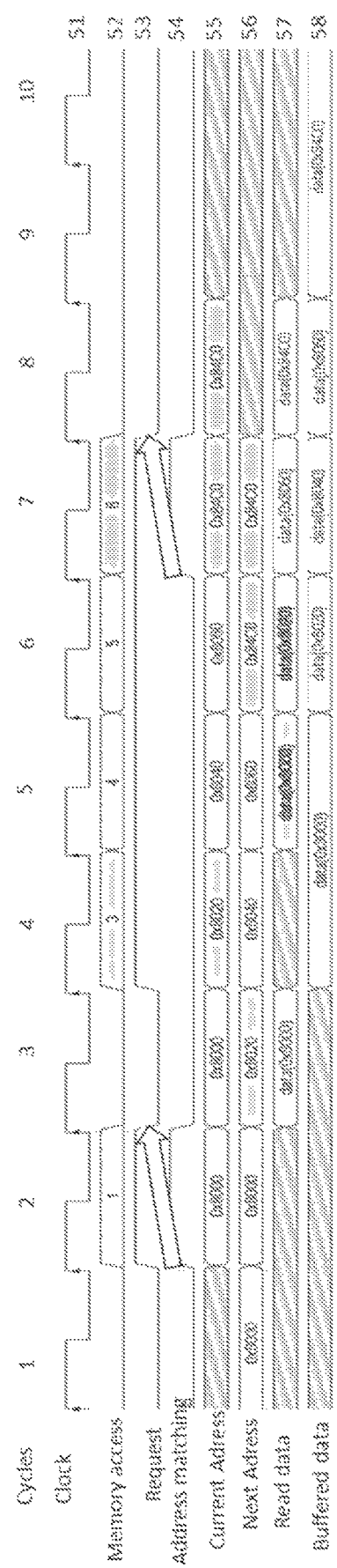

DIGITAL EVENT ENCODING FOR OPERATING AN EVENT-BASED IMAGE SENSOR

CROSS-REFERENCE TO RELATED APPLICATION(S)

This application is a U.S. National Stage application of International Application No. PCT/EP2022/050678, filed Jan. 13, 2022, which claims priority to EP Application No. 21305038.8, filed Jan. 14, 2021. Each of the above-referenced applications is expressly incorporated herein by reference in its entirety.

TECHNICAL FIELD

The invention relates to a method for operating an event-based image sensor, also called neuromorphic sensor.

BACKGROUND OF THE INVENTION

In conventional video cameras, the apparatus records photogram after photogram. In event-based image sensors, there are no photograms. Like in video cameras, the integrated circuit contains a photo sensor matrix. However, in conventional video cameras, each photo sensor is sampled at a fixed frequency, whereas in temporal contrast sensors, pixels are not sampled: each pixel calculates the intensity change of the light it senses, optionally performs some processing on this intensity change, and when the calculated quantity exceeds a defined level or threshold, the pixel generates an "analog pixel event", or APE.

The APE must be processed to transmit the information that a light intensity change occurred on the pixel from which the APE originates. A readout is performed to transmit the APE in the form of digital events to a processing pipeline in which various processing are performed, for example filtering, formatting, packetizing, interfacing, etc. . . . . Some processing elements such as filters, and especially spatiotemporal filter and anti-flickering, require accessing to data related to the pixel which has been previously stored in memory. Many memory accesses are involved, implying a huge power consumption, especially since the memory is typically SRAM (static random-access memory). SRAM has low idle power consumption but high operational power consumption. The power consumption of SRAM is therefore directly correlated to how frequently it is accessed.

In order to achieve a good rendering to the image dynamics, the sensor is configured so that even tiny light changes might trigger APE in at least one pixel. In addition, always desired higher resolutions mean that more pixels generate events. Consequently, many events must be processed every second, involving many memory accesses. As a result, the sensor experiences a substantial power consumption.

Accordingly, there is a need for an event-based image sensor with a reduced power consumption, without sacrificing resolution or sensitivity.

SUMMARY OF THE INVENTION

The invention relates to a method for operating an event-based image sensor comprising a plurality of pixel circuits arranged to form a pixel array, each pixel being arranged at a location defined by an address, wherein each pixel circuit comprises:

a photoreceptor circuit configured for delivering a photoreceptor signal derived from a photocurrent generated by a light impinging on a light-sensitive element of the photoreceptor, a change detector configured for detecting a change in the photoreceptor signal, and generating an event each time a change is detected in the photoreceptor signal, wherein an event is characterized by a first polarity or a second polarity reflecting a direction of the change in the photoreceptor signal, wherein the method comprises:

performing a line readout of groups of adjacent pixels of a line of pixels, the line readout comprises generating, for each group of pixels, at least one packet expressing occurrences of events of a same polarity in said group of pixels, each packet being characterized by the first polarity or the second polarity of the events expressed in said packet and by a group address derived from at least an address of a pixel of said group of pixels, sending said packets to a processing pipeline where the packets are successively processed, said processing pipeline including at least one event processing of packets involving at least one memory access based on the group address of a processed packet, wherein two packets sharing the same group address have different polarities and are consecutively processed in the event processing.

The invention allows to significantly reduce power consumption of the event-based image sensor. When analog pixel events of both polarities occur in a same group of adjacent pixels, only one read memory access and only one write memory access are needed instead of two read memory accesses and two one write memory accesses for processing the generated events. Since memory access is very power intensive, limiting the number of memory accesses significantly decrease the power consumption of the event-based image sensor.

Other preferred, although non-limitative, aspects of the invention are as follows, isolated or in a technically feasible combination:

during the line readout, packets are generated only for the groups of adjacent pixels where an event occurred in at least one pixel;

two packets sharing the same group address have different polarities;

sending the packets to the processing pipeline comprises arranging the packets into a line sequence, two packets sharing the same group address being arranged adjacent to each other in the line sequence, sending said line sequence to the processing pipeline;

each packet contains a header comprising a polarity indicator indicating the polarity of the packet, the group address, and each packet contains an event vector indicating which one of the pixels of the group generated an event;

during the line readout a line of pixel is divided into at least 6 groups of adjacent pixels, each group comprising at least 10 adjacent pixels during the event processing of two packets sharing the same group address, only one read memory access and only one write memory access are performed for said two packets;

the event processing comprises comparing a group address of a currently processed packet with a group address of a next packet or a previous packet in the processing pipeline, and preventing a memory access if a match is found between the group address of the currently processed packet and the group address of the next packet or the previous packet;

the event processing comprises comparing a group address of a currently processed packet with a group address of a next packet in the processing pipeline, and if a match is found between the group address of the currently processed packet with the group address of the next packet, data related to the group address is stored in a buffer instead of being written in a memory;

during the event processing of a packet with a same group address as a previous packet, data related to said group address is retrieved from a buffer instead of being retrieved in a memory with a location dedicated to each group address;

the event processing comprises comparing a group address of a currently processed packet with a group address of a next packet or a previous packet in the processing pipeline, and wherein the comparison is hardware-implemented.

The invention also relates to an event-based image sensor comprising a plurality of pixel circuits arranged to form a pixel array, each pixel being arranged at a location defined by an address, wherein each pixel circuit comprises:

a photoreceptor circuit configured for delivering a photoreceptor signal derived from a photocurrent generated by a light impinging on a light-sensitive element of the photoreceptor, a change detector configured for detecting a change in the photoreceptor signal, and generating an event each time a change is detected in the photoreceptor signal, wherein an event is characterized by a first polarity or a second polarity reflecting a direction of the change in the photoreceptor signal, a monitoring circuit configured to monitor occurrence of events in the pixels, and to trigger a line readout, a readout circuit configured to perform the line readout, generating, for each group of pixels, at least one packet expressing occurrences of events of a same polarity in said group of pixels, each packet being characterized by the first polarity or the second polarity of the events expressed in said packet and by a group address derived from at least an address of a pixel of said group of pixels, a processing pipeline where the packets are successively processed, said processing pipeline including at least one event processing of packets involving at least one memory access based on the group address of a processed packet, and configured to process consecutively two packets sharing the same group address, wherein the event-based image sensor is configured to perform the steps of the method according to the invention.

BRIEF DESCRIPTION OF THE DRAWINGS

Other aspects, objects and advantages of the present invention will become better apparent upon reading the following detailed description of preferred embodiments thereof, given as non-limiting examples, and made with reference to the appended drawings wherein:

FIG. 3 depicts in a schematic way an example of how are generated packets expressing occurrences of APE of a same polarity groups of pixels;

FIG. 4 is a flowchart showing how packets are handled by an event processing;

FIG. 5 is a digital timing diagram of signals involved in an event processing for the example of FIG. 3.

DETAILED DESCRIPTION OF THE INVENTION

Figure 1:
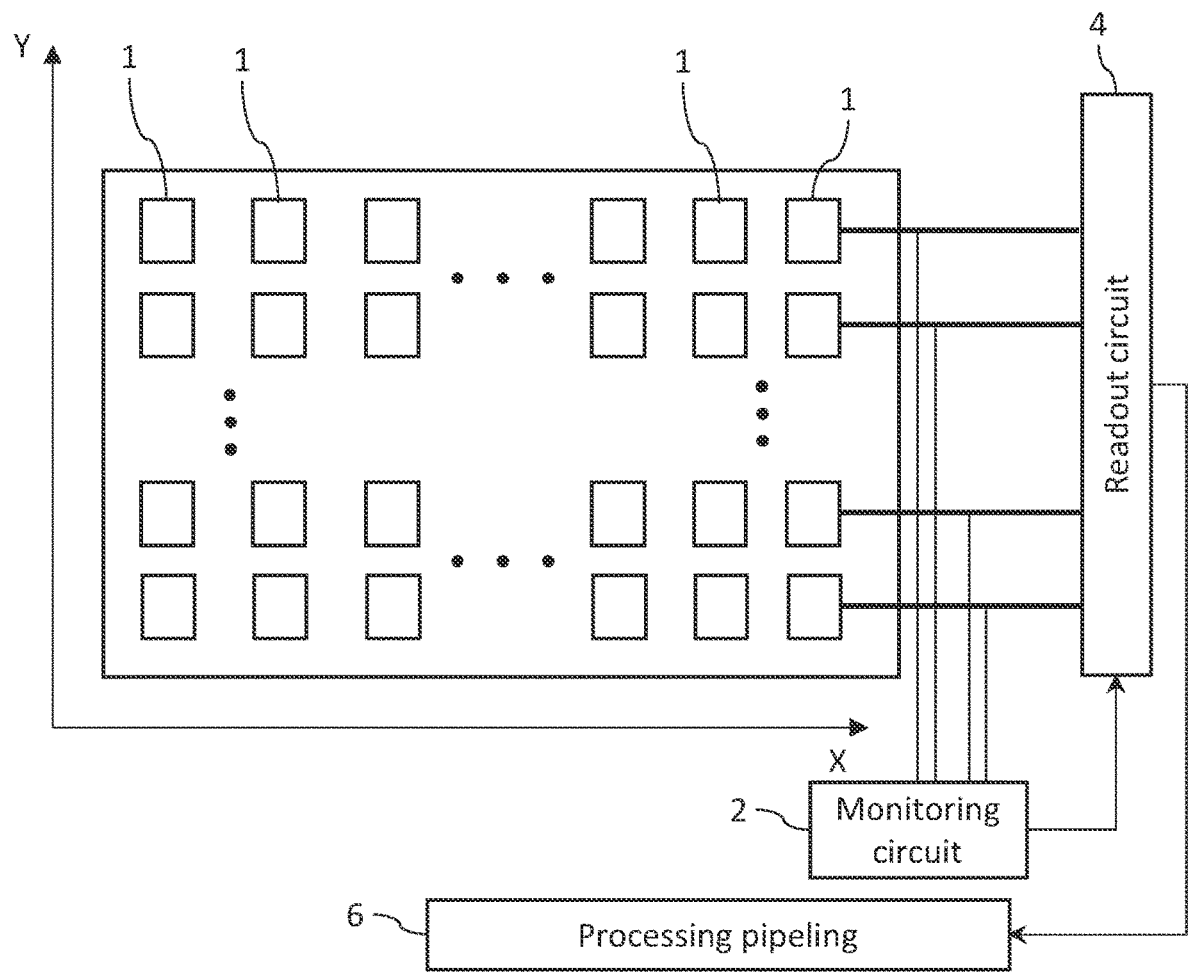
FIG. 1 shows a simplified diagram of a pixel array of an event-based image sensor according to a possible embodiment of the invention.
Figure 2:
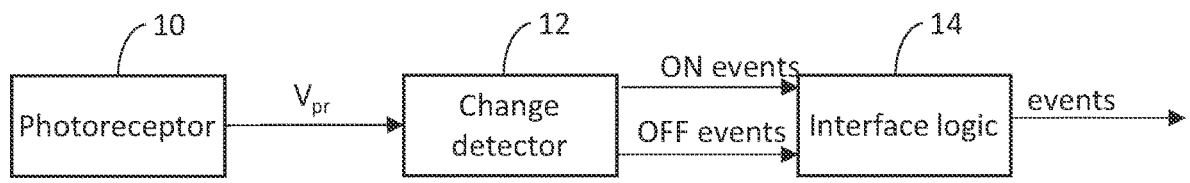
FIG. 2 shows a simplified diagram of the structure of a pixel of a pixel array of an event-based image sensor according to a possible embodiment of the invention.

A simplified diagram of an event-based image sensor according to a possible embodiment is shown in FIG. 1. The event-based image sensor comprises a plurality of pixel circuits, or more simply pixels 1, forming a pixel array. FIG. 1 shows a limited number of pixels 1 for clarity's sake. It is understood that the pixel array comprises a large number of pixels 1, with dimensions exceeding 256×256 pixels for example, and for example with a resolution of 1280×720 pixels. As illustrated on FIG. 2, each pixel 1 comprises a photoreceptor circuit 10 configured for delivering a photoreceptor signal derived from the photocurrent generated by light impinging on a light-sensitive element of the photoreceptor 10, and a change detector 12 configured for detecting a change in the photoreceptor signal $V_{pr}$ derived from the photocurrent. A band-pass filter can be provided between the photoreceptor circuit 10 and the change detector 12 to filter the photoreceptor signal $V_{pr}$.

The light-sensitive element of the photoreceptor 10 is typically a photodiode and converts incident light into a photocurrent, determined by the light exposure of the light-sensitive element. The photoreceptor signal $V_{pr}$ is usually in a logarithmic relationship with the photocurrent. Typically, the photoreceptor signal $V_{pr}$ can be approximated as $$V_{pr}=k_1 \ln(I_{pr})+k_2$$

wherein $I_{pr}$ is the intensity of the photocurrent, $k_1$ and $k_2$ are constant factors. The instantaneous voltage value of the photoreceptor signal $V_{pr}$ relates logarithmically to the instantaneous intensity of the photocurrent, and consequently a measurement of the photoreceptor signal $V_{pr}$ allows to derive the light exposure level of the light-sensitive element of the photoreceptor circuit 10.

The change detector 12 is configured to detect a change in the photoreceptor signal $V_{pr}$. The change detector 12 continuously monitors the photoreceptor signal $V_{pr}$ for changes and emits a detection signal each time a change is detected. A detection signal identifies a fractional increase or decrease in the photoreceptor signal $V_{pr}$ that exceeds adjustable voltage thresholds. The change in the photoreceptor signal $V_{pr}$ is therefore translated into an analog pixel event, or APE, in the detection signal of a pixel.

An event is characterized at least by a polarity (indifferently designated as high/low, positive/negative, or ON/OFF) reflecting a direction of the change in the photoreceptor signal $V_{pr}$ caused by the APE. More precisely, the change detector 12 generates a high polarity event when the photoreceptor signal $V_{pr}$ increases, i.e. exceeds by a threshold a previous value, and the change detector 12 generates a low polarity event when the photoreceptor signal $V_{pr}$ decreases, i.e. comes below a threshold with respect to a previous value. A comparator is usually used to compare the instantaneous value of the photoreceptor signal $V_{pr}$ with a previous value used as a reference. An event is not only characterized by a polarity, but is also characterized by a pixel address constituted by the line and column coordinates (respectively x, y) of the pixel 1 in which the event is generated. An event is also generated or sent at a particular time, and may also be characterized by an occurrence time. A change detector 12 that can be used for detecting changes in lighting intensity received by the pixels, for example in the case of dynamic vision sensor (DVS), is described in U.S. Pat. Nos. 7,728,269 and 8,780,240.

In the absence of fixed frequency sampling, it is the occurrence of an event in a pixel 1 that triggers the readout of the pixel 1. The generation of events is conditioned by the light intensity change of the scene imaged by the event-based sensor. Therefore, event generation by the pixels 1 is unpredictable, and many events can occur at the same time. In addition, the higher the number of pixels 1, the higher the number of events to be processed. To match speed and efficiency requirements, readout is performed to process the event of the pixels of a same line in a same reading cycle.

The readout is triggered by a monitoring circuit 2 that monitors the occurrence of events in the pixels. For example, each occurrence of an event generates a line signal sent on a common line bus which is monitored by the monitoring circuit 2. The monitoring circuit thus may include as many inputs as there are lines in the pixel array, and therefore is able to identify a line where an event occurred. The monitoring circuit 2 triggers a line readout when a line signal is sensed.

Typically, such a readout is performed by a readout circuit 4. For example, the readout circuit 4 includes as many inputs as there are columns in the pixel array, one input for each column. When a line readout is triggered, the states of all the pixels 1 of the line are simultaneously duplicated onto the inputs of the readout circuit 4. The state of a pixel 1 indicates whether an event occurred in said pixel 1 during a certain amount of time, typically since the last readout. The pixels 1 of the same line are therefore read simultaneously. The line readout generates an event for each pixel where an event occurred.

In order to speed up the line readout, a line of pixels 1 is divided into groups of adjacent pixels of the line. Typically, a line is divided into at least 6 groups of adjacent pixels, and preferably at least 8 groups of adjacent pixels, and more preferably at least 12 groups of adjacent pixels, each group comprising at least 10 adjacent pixels. In the example of FIG. 3, upper plot, a line of 1280 pixels is divided into 40 groups 21, 22, 23, 24, 25 of 32 adjacent pixels. Of course, it is possible to divide the line otherwise. A first group 21 of adjacent pixels is constituted by the pixels with X coordinates 0 to 31, a second group 22 of adjacent pixels is constituted by the pixels with X coordinates 32 to 63, a third group 23 of adjacent pixels is constituted by the pixels with X coordinates 64 to 95, a fourth group 24 of adjacent pixels is constituted by the pixels with X coordinates 96 to 127, etc.

In FIG. 3, a downwards arrow denotes a first polarity event (e.g. low polarity) indicating that the light intensity decreased for that pixel 1, and an upwards arrow denotes a second polarity event (e.g. high polarity) indicating that the light intensity increased for that pixel 1. The line readout generates digital events corresponding the analog pixel event, which are grouped in accordance with their polarities and the grouping of the pixels 1.

The line readout comprises generating, for each group of pixels, at least one packet expressing occurrences of events of a same polarity in said group of pixels, each packet being characterized by the first polarity or the second polarity of the events expressed in said packet and by a group address derived from at least an address of a pixel of said group of pixels. The polarity of a packet is inherited from the polarity of the events expressed in the packet. Each packet is related to only one polarity. The events are expressed through an event vector.

More precisely, the events of a group of pixels are encoded into an event vector which expresses occurrences of events of a same polarity in the group, with a conservation of the location of the events in the pixel group. If events of the two polarities occur in the same group, two event vectors are generated: one for each polarity. If events of only one polarity occur in the same group, only one event vector is generated. In the example of FIG. 3, low and high polarity events occurred in the first group of pixels 21. Accordingly, a first event vector is generated for the low polarity events of the first group of pixels and a second vector is generated for the high polarity events of the same first group of pixels. In the second group 22 of pixels, only high polarity events occurred. Accordingly, only one event vector is generated for the second group of pixels 22, with only high polarity events. Preferably, during the line readout, event vectors are generated only for the groups of adjacent pixels where an event occurred in at least one pixel.

An event vector comprises a sequence of bits indicating the events. The sequence of bits is of the same length as the group of pixels, i.e. there are as many bits as there are pixels 1 in the group of pixels. To each bit of the sequence corresponds a pixel in the group, and the order of the bits corresponds to the order of the pixels 1 in the group. The state of a bit, i.e 0 or 1, depends on whether an event occurred in the corresponding pixel. In the example of FIG. 3, a bit at 1 denotes that an event occurred in the corresponding pixel 1, and a bit at 0 denotes that no event occurred in the corresponding pixel. Other encodings could be used. Accordingly, in the first event vector expressing the events of low polarity in the first group 21 of pixels, the three low polarity events are translated into three bits set to 1 in the event vector, the other bits being at zero. In the second event vector expressing the events of high polarity in the first group 21 of pixels, the two positive events are translated into two bits set to 1 in the event vector, the other bits being at zero. In the third event vector expressing the events of high polarity in the second group of pixels 22, the four positive events are translated into four bits set to 1 in the third event vector, the other bits being at zero.

An event vector is associated with features of the group of pixels from which it is derived. To this end, each event vector is encapsulated in a packet 30 (i.e. packet 30*a*, 30*b*, 30*c*, 30*d*, 30*e*, 30*f*) comprising the event vector and a header wherein the associated features are stored. As the event vector contained in the packet, the packet expresses occurrences of events of a same polarity in a group of adjacent pixels. Accordingly, the packet 30 is also characterized by a first polarity or a second polarity corresponding to the first polarity or the second polarity, respectively, of the events expressed in said packet. The packet 30 is also characterized by a group address derived from, or at least related to, at least an address of a pixel 1 of the group of adjacent pixels related to the packet 30.

In the example of FIG. 3, the header includes a first sequence 31 coding the polarity of the events expressed in the event vector 35. In this example, 0x0 denotes the first polarity (low) whereas 0x1 denotes the second polarity (high). The header includes a second sequence 32 coding a timestamp, for example the least significant bits of the event time base, related to the time at which the readout occurred. In this example, all the packets 30*a*, 30*b*, 30*c*, 30*d*, 30*e*, 30*f*, 30*g* share the same timestamp coded as 0x5 since the groups of pixels are read simultaneously during the line readout.

The header includes a third sequence 33 and a fourth sequence 34 coding the group address. In this example, the group address of a packet 30 is constituted by the combination of the X-coordinate and Y-coordinate of the first pixel of the group of pixels, but it is of course possible to encode the group address differently as long as said group address allows identifying each pixels of the group of pixels to which said packet 30 is related.

The third sequence 33 encodes the X-coordinate of the group address, which corresponds to the X-coordinate of the first pixel of each group of pixels. In this example, the third sequence 33 is coded in hexadecimal Thus, the third sequence 33 of the first packet 30a and the second packet 30b is 0x0 since they are derived from the same first group 21 of pixels, the third sequence 33 of the third packet 30c is 0x20 because the first pixel of the second group 22 of pixels is the 32th pixel of the line, the third sequence 33 of the fourth packet is 0x40 because the first pixel of the third group 23 of pixels is the 64th pixel of the line, etc. In this example, the groups of pixels comprise 32 pixels, and consequently, the X-coordinates of the group addresses are separated by multiples of 32. Of course, other lengths of pixel groups of result in different spacings between the X-coordinates of the group addresses.

The header includes a fourth sequence 34 coding the Y-coordinate of the group address, which is coded as 0x8 for all the packets 30 since they all correspond to the pixels of the same 8th line. Finally, the packet 30 includes the event vector, in this example a sequence of 32 bits at 0 or 1, depending on whether an event occurred in the corresponding pixel, as explained above.

Preferably, during the line readout, packets 30 are generated only for the groups of adjacent pixels where an event occurred in at least one pixel. Also, at least one packet 30 is generated for each group of adjacent pixels where an event occurred in at least one pixel. It shall be noted that two packets 30 sharing the same group address have different polarities, since two packets 30 with the same group address are only generated when first polarity events and second polarity events occurred in the same group of pixels.

Once generated, the packets 30 are sent to a processing pipeline 6 where the packets 30 are successively processed, i.e. in the same order as they are sent in the processing pipeline 6. Typically, a line sequence of packets is created by concatenating the packets 30, and the line sequence is sent to the processing pipeline 6. In FIG. 3, the sequence of packets is illustrated by the arrangement of the packets 30. The first packet 30a is followed by the second packet 30b, followed by the third packet 30c, followed by the fourth packet 30d, followed by the fifth packet 30e, followed by the sixth packet 30f, followed by the seventh and last packet 30g.

Preferably, most of the processing is hardware-implemented, and there is no processor involved, due to the fact that the packets 30 must be processed extremely fast. As will be explained below, the event processing may comprise comparing a group address of a currently processed packet with a group address of a next packet or a previous packet in the processing pipeline 6. Preferably, at least the comparison is hardware-implemented. Such a comparison is performed by an electronic device forming a comparator, for example consisting in a set of logic gates (AND, NAND, NOR, etc.). Such a hardware comparator does not execute instructions and therefore is not a processor. As already explained, various event processes may be performed in the processing pipeline 6, for example filtering, formatting, etc. . . . . At least one event process involves at least one memory access. For example, spatiotemporal filter and anti-flickering require accessing to data related to the pixel which has been previously stored in a memory. In the case of anti-flickering, the memory may store the durations between consecutive events, in order to detect a regular pattern denoting a flickering. The memory may also store a counter, specific to each pixel, which is incremented or decremented each time an event associated with said pixel is received.

The memory is for example a RAM (random-access memory), and typically a SRAM (static random-access memory) due to its short access time. The memory stores data related to the pixels beyond the readout cycle. To each group of pixels is associated a location in the memory where data related to said group of pixels is stored. Such data is retrieved through the group address (x, y coordinates), which is translated into the corresponding memory location. Such data can also be overwritten, or completed with additional data.

The pixel address of a particular event is retrieved through the group address associated with the packet 30. The Y-coordinate is encoded in the fourth sequence 34 of the header and can therefore be immediately determined. The X-coordinate of an event is defined by the x-coordinate of the group address coded in the third sequence 33 of the header and by the position of the corresponding bit in the event vector. For example, the $i^{th}$ bit of an event vector having n as X-coordinate in its group address corresponds to the $(n+i)^{th}$ pixel of the line. Theoretically, one memory access would be required for processing each event. However, for the sake of efficiency, and since the events are processed by group of pixels, data related to a group of pixels are treated concurrently. This means that the actual memory location corresponds to the pixels of the groups of pixels. The memory access is thus based on the group address, and one memory access is enough for processing the data associated with the pixels of a group of pixels.

Theoretically, one memory access would be required for processing each packet 30 since the packets 30 are normally processed independently one from another. In the invention however, two packets 30 sharing the same group address are consecutively processed in the event processing, and two packets 30 sharing the same group address are not dealt with completely independently. During the event processing of two packets 30 sharing the same group address, only one read memory access and only one write memory access are performed for said two packets. More specifically, the event processing comprises comparing a group address of a currently processed packet 30 with a group address of a next packet 30 in the processing pipeline 6, and preventing at least a memory access if a match is found between the group address of the currently processed packet 30 with the group address of the next packet 30. The memory access can be prevented during the processing of the currently processed packet 30 and/or during the later processing of the next packet 30. The prevented memory access can for example be data retrieval and/or data writing. If a match is found between the group address of the currently processed packet 30 with the group address of the next packet 30, data related to the group address is stored in a buffer instead of being written in a memory, thereby avoiding a write memory access During the event processing of a packet 30 with a same group address as a previous packet 30, data related to said group address is retrieved from the buffer instead of being retrieved from the memory with a location dedicated to each group address, thereby avoiding a read memory access.

Preferably, to ensure that two packets 30 sharing the same group address are consecutively processed in the event processing, the packets are organized in a specific order in the pipeline. Two packets 30 having the same group address are arranged adjacent in the processing pipeline 6, i.e. one after the other. For example, they are concatenated adjacent to each other in the line sequence. Specifically, a packet 30 of a first polarity and a packet 30 of the second polarity related to a same group of pixels are concatenated adjacent to each other. Since the packets 30 are processed in accordance with their order in the pipeline, two packets 30 which share the same group address are consecutively processed in the event processing. This is illustrated in FIG. 3, where the first packet 30a and the second packet 30b, both with the same group address corresponding to the first group 21 of pixels, are adjacent. The same applies to the $6^{th}$ packet 30f and the $7^{th}$ packet 30g, which share the same group address (X-coordinate 0x4C0).

FIG. 4 shows an example of how the packets 30 can be processed. In this example, the memory is a SRAM, but it could be another kind of memory. A buffer is used. The buffer stores transitory data, and the same buffer is used for processing all the packets 30, whatever their group addresses. On the opposite, the memory includes several memory locations which are each dedicated to a group address. A specific memory location is used for a specific group address.

After the start (step S1), a new packet 30 is received (step S2). A first flag test is done to determine whether a match flag is set or not (step S3). The state of the match flag depends on the processing of the previously processed packet 30, and for example is stored in a register. If the flag is not set, a match test is done (step S4) to determine whether the current address (i.e. the group address of the current packet 30) is the same as the next address (i.e. the group address of the next packet 30 that will be processed immediately after). If the next address is the same as the current address, the match flag is set (step S5). Otherwise, the match flag is not set. In both cases, in the next step (step S6), data associated with the group address of the packet 30 is retrieved from the SRAM memory at the memory location corresponding to the group address. The retrieved data is buffered in the buffer.

If the first flag test (step S3) shows that the match flag is set, the match flag is reset (step S7) and the data are retrieved (step S8) from the buffer instead of being retrieved from the SRAM memory. Once the required data has been retrieved, the processing algorithm is performed (step S9), i.e. the events contained in the packet 30 are processed in accordance with the retrieved data and the purpose of the event processing (filtering, anti-flickering, etc.). The results of the processing algorithm can be buffered (step S10)

The algorithm determines whether the results are to be written in the SRAM memory (step S11). If the results are not to be written in the SRAM memory, the processing of the packet is ended (step S12). If the results are to be written in the SRAM memory, a second flag test is performed (step S13). If the flag has been previously set (step S5), the processing of the packet is ended (step S12). If the flag is not set, the buffered results are written in the SRAM memory at the location corresponding to the group address of the packet (step S14).

Through the match flag, the event processing is informed that the buffered data can be used instead of being retrieved in the SRAM memory if the two packets 30 share the same group address. A memory access is thus avoided. The use of a flag is a mere example, not a requirement, and other strategy may be adopted to achieve the same results. For example, a comparison could be made between the group address of the current packet 30 and the group address of the previous packet 30.

FIG. 5 is a digital timing diagram of signals involved in an event processing for the example of FIG. 3. The first, upper, row 51 is the clock signal, defining a cycle between two rising edges of the clock signal. The second row 52 shows the memory accesses, with the numbers corresponding to the packets 30 of FIG. 3. A high level indicates that a memory access occurs during the cycle, whereas a low level indicates that no memory access occurs during the cycle. The third row 53 shows the memory requests, made during the event processing to access the memory. A high level indicates that a memory request occurs during the cycle, whereas a low level indicates that no memory request occurs during the cycle. The fourth row 54 shows the result of the first flag test, i.e. whether the current address and the next address are matching. A high level indicates a match, whereas a low level indicates that there is no match.

The fifth row 55 shows the current address, i.e. the group address of the packet currently processed, and the sixth row 56 shows the next address, i.e. the group address of the next packet to be processed, subsequent in the pipeline to the packet currently processed. The seventh row 57 shows the data read in the memory, and the eight row 58 shows the data buffered in the buffer. In FIG. 5, the group address is denoted with the Y-coordinate before the X-coordinate of the first pixel of the group (in hexadecimal). Hence the group address 0x8000 refers to the group of the $8^{th}$ line, $0^{th}$ to $31^{th}$ pixels; the group address 0x8020 refers to the group of the $8^{th}$ line, $32^{th}$ to $63^{th}$ pixels; the group address 0x8040 refers to the group of the $8^{th}$ line, $64^{th}$ to $95^{th}$ pixels, etc. Data (0x8000) refers to the data associated with the pixels of the packet of group address 0x8000, data(0x8020) refers to the data associated with the pixels of the packet of group address 0x8020, etc. . . . . .

At the first cycle, there is no current group address, and the next group address is the group address of the first packet 30a, 0x8000, derived from the first group of pixels 21, i.e. of the $8^{th}$ line, od to $31^{th}$ pixels. Accordingly, at the second cycle, this group address 0x8000 has become the current group address, and a memory access is done in response to a memory request based on said current group address of 0x8000. The next group address is the group address of the second packet 30b, and is still the same group address of the first packet 30a. i.e. 0x8000. Indeed, as shown on FIG. 3, the first two packets 30a, 30b share the same group address, but show different polarities. The result of the match test is yes since the current group address and the next address match, and accordingly the address matching signal (or flag) goes up to the high level.

At the third cycle, the data read as a result of the memory access based on the previous current group address 0x8000 is data(0x8000). The current group address is the group address of the second packet 30b, i.e. still 0x8000. Due to the fact that the address matching signal (flag) was high in the previous cycle, the result of the first flag test is yes, and no memory request is made and no memory access is performed. The next group address is the group address of the third packet 30c, i.e. 0x8020, referring to the group of the $8^{th}$ line, $32^{th}$ to $63^{th}$ pixels. Since the next group address is different from the current group address or because the address matching signal is automatically reset (S7) to avoid a comparison, the address matching signal goes back to the low level.

At the fourth cycle, the group address of the third packet 30c, i.e. 0x8020, has become the current group address, and the group address of the fourth packet 30d, i.e. 0x8040, has become the next group address. Since the next group address is different from the current group address, the result of the match test is no, and the address matching signal stays at the low level. As the address matching signal was low in the previous cycle (first flag test result is no), a memory request is made and a memory access is performed for the current group address 0x8020. But since there was no memory access during the previous cycle, no data is read. The previously read data data(0x8000) is stored in the buffer and can be used for the processing algorithm.

At the fifth cycle, the group address of the fourth packet 30d, i.e. 0x8040, is now the current group address, and the group address of the fifth packet 30e, i.e. 0x8060, is the next group address Since the next group address is different from the current group address, the result of the match test is no and the address matching signal stays at the low level. As the address matching signal was low in the previous cycle (first flag test result is no), a memory request is made and a memory access is performed for the current group address 0x8040. As a result of the previous memory access, data corresponding to the previous current group address 0x8020, i.e. data(0x8020) is read. The buffered data remains the data related to the first group address (data(0x8000)) since the processing of the second packet 30b uses the same stored data as for the first packet 30c.

At the sixth cycle, the group address of the fifth packet 30e, i.e. 0x8060, is now the current group address, and the group address of the sixth packet 30f, i.e. 0x84C0, is the next group address. Since the next group address is different from the current group address, the result of the match test is no and the address matching signal stays at the low level. As the address matching signal was low in the previous cycle, a memory request is made and a memory access is performed for the current group address 0x8060. As a result of the previous memory access, data corresponding to the previous current group address 0x8040, i.e. data(0x8040) is read. The previously read data data(0x8020) is buffered and can be used to process the third packet 30c.

At the seventh cycle, the group address of the sixth packet 30f, i.e. 0x84C0, is now the current group address, and the group address of the seventh packet 30g, i.e. 0x84C0, is the next group address. As shown on FIG. 3, the sixth packet 30f and the seventh packet 30g share the same group address, but show different polarities. The match test shows that the current group address and the next address actually match, and accordingly the address matching signal goes up to the high level. As the address matching signal was low in the previous cycle, a memory request is made and a memory access is performed for the current group address 0x84C0. As a result of the previous memory access, data corresponding to the previous current group address 0x8060, i.e. data(0x8060) is read. The previously read data data(0x8040) is buffered and can be used to process the fourth packet 30d.

At the eighth cycle, the group address of the seventh packet 30g, i.e. 0x84C0, is now the current group address, and there is no next group address since this is the last packet. As a consequence, the result of the match test is no and the address matching signal goes back at the low level. The data read as a result of the memory access based on the previous current group address 0x84C0 is data(0x84C0). Due to the fact that the address matching signal was high in the previous cycle, no memory request is made and no memory access is performed. The previously read data data(0x8060) is buffered and can be used to process the fifth packet 30e.

At the ninth cycle, there is no current or next group address. Indeed, in the processing pipeline, 6 the results of two line readouts are separated by blank packets, so that a number of empty cycles separates the processing of the results of two line readouts. For example, two line readouts are separated with between 4 and 12 empty cycles, and preferably between 6 and 10 empty cycles. In the absence of any current group address, no memory request is made and no memory access is performed. The previously read data corresponding to the sixth group of pixels, i.e. data (0x84C0), is buffered and can be used to process the sixth packet 30g. At the tenth cycle, the buffered data was no replaced and therefore is still the same data, i.e. data (0x84C0), which can be used to process the seventh and last packet 30g, which shares the same group address as the sixth packet 30f.

As explained above, the fact that two packets sharing the same group address are consecutively processed in the event processing allows reusing the same data, without having to retrieved it from the memory. As in the examples, the address matching signal can be used as a flag to prevent a redundant memory access. As a result, a memory access is avoided when events of different polarities occur in the same group of pixels. Since memory accesses are very power consuming, avoiding memory accesses leads to reduced power consumption and heat generation. This effect is especially noticeable when the imaged scene causes rapid intensity changes.

While the present invention has been described with respect to certain preferred embodiments, it is obvious that it is in no way limited thereto and it comprises all the technical equivalents of the means described and their combinations. In particular, it will be apparent to those skilled in the art that various changes and modifications may be made without departing from the scope of the invention as defined in the appended claims.

The invention claimed is:

1. A method for operating an event-based image sensor comprising a plurality of pixel circuits arranged to form a pixel array, each pixel being arranged at a location defined by an address, wherein each pixel circuit comprises:
   a photoreceptor circuit configured for delivering a photoreceptor signal derived from a photocurrent generated by a light impinging on a light-sensitive element of the photoreceptor, and
   a change detector configured for detecting a change in the photoreceptor signal and generating an event each time a change is detected in the photoreceptor signal, wherein an event is characterized by a first polarity or a second polarity reflecting a direction of the change in the photoreceptor signal,
   wherein the method comprises:
      performing a line readout of groups of adjacent pixels of a line of pixels, the line readout comprises generating, for each group of pixels, at least one packet expressing occurrences of events of a same polarity in said group of pixels, each packet being characterized by the first polarity or the second polarity of the events expressed in said packet and by a group address derived from at least an address of a pixel of said group of pixels; and
      sending said packets to a processing pipeline where the packets are successively processed, said processing pipeline including at least one event processing of packets involving at least one memory access based on the group address of a processed packet, wherein two packets sharing the same group address have different polarities and are consecutively processed in the event processing.

2. The method of claim 1, wherein during the line readout, packets are generated only for the groups of adjacent pixels where an event occurred in at least one pixel.

3. The method of claim 1, wherein sending the packets to the processing pipeline comprises:
arranging the packets into a line sequence, two packets sharing the same group address being arranged adjacent to each other in the line sequence; and
sending said line sequence to the processing pipeline.

4. The method of claim 1, wherein each packet contains a header comprising a polarity indicator indicating the polarity of the packet, the group address, and an event vector indicating which one of the pixels of the group generated an event.

5. The method of claim 1, wherein during the line readout a line of pixel is divided into at least 6 groups of adjacent pixels, each group comprising at least 10 adjacent pixels.

6. The method of claim 1, wherein during the event processing of two packets sharing the same group address, only one read memory access and only one write memory access are performed.

7. The method of claim 1, wherein the event processing comprises comparing a group address of a currently processed packet with a group address of a next packet or a previous packet in the processing pipeline, and preventing a memory access if a match is found between the group address of the currently processed packet and the group address of the next packet or the previous packet.

8. The method of claim 1, wherein the event processing comprises comparing a group address of a currently processed packet with a group address of a next packet in the processing pipeline, and if a match is found between the group address of the currently processed packet with the group address of the next packet, data related to the group address is stored in a buffer instead of being written in a memory.

9. The method of claim 1, wherein during the event processing of a packet with a same group address as a previous packet, data related to said group address is retrieved from a buffer instead of being retrieved in a memory with a location dedicated to each group address.

10. The method of claim 1, wherein the event processing comprises comparing a group address of a currently processed packet with a group address of a next packet or a previous packet in the processing pipeline, and wherein the comparison is hardware-implemented.

11. An event-based image sensor comprising a plurality of pixel circuits arranged to form a pixel array, each pixel being arranged at a location defined by an address, wherein each pixel circuit comprises:
a photoreceptor circuit configured for delivering a photoreceptor signal derived from a photocurrent generated by a light impinging on a light-sensitive element of the photoreceptor;
a change detector configured for detecting a change in the photoreceptor signal, and generating an event each time a change is detected in the photoreceptor signal, wherein an event is characterized by a first polarity or a second polarity reflecting a direction of the change in the photoreceptor signal;
a monitoring circuit configured to monitor occurrence of events in the pixels, and to trigger a line readout;
a readout circuit configured to perform the line readout, generating, for each group of pixels, at least one packet expressing occurrences of events of a same polarity in said group of pixels, each packet being characterized by the first polarity or the second polarity of the events expressed in said packet and by a group address derived from at least an address of a pixel of said group of pixels; and
a processing pipeline where the packets are successively processed, said processing pipeline including at least one event processing of packets involving at least one memory access based on the group address of a processed packet, and configured to process consecutively two packets sharing the same group address,
wherein the event-based image sensor is configured to implement a method comprising
performing a line readout of groups of adjacent pixels of a line of pixels, the line readout comprises generating, for each group of pixels, at least one packet expressing occurrences of events of a same polarity in said group of pixels, each packet being characterized by the first polarity or the second polarity of the events expressed in said packet and by a group address derived from at least an address of a pixel of said group of pixels; and
sending said packets to a processing pipeline where the packets are successively processed, said processing pipeline including at least one event processing of packets involving at least one memory access based on the group address of a processed packet, wherein two packets sharing the same group address have different polarities and are consecutively processed in the event processing.

* * * * *

UNITED STATES PATENT AND TRADEMARK OFFICE
CERTIFICATE OF CORRECTION

PATENT NO. : 12,063,444 B1
APPLICATION NO. : 18/272330
DATED : August 13, 2024
INVENTOR(S) : Guillaume Schon et al.

It is certified that error appears in the above-identified patent and that said Letters Patent is hereby corrected as shown below:

In the Claims

Claim 5, Column 13, Line 21, "a line of pixel" should read --a line of pixels--.

Signed and Sealed this
Eighth Day of October, 2024

Katherine Kelly Vidal
*Director of the United States Patent and Trademark Office*